United States Patent
Xie et al.

(10) Patent No.: US 12,099,177 B2
(45) Date of Patent: Sep. 24, 2024

(54) LENS-FREE MICROSCOPIC IMAGING SYSTEM AND METHOD, AND BIOCHEMICAL SUBSTANCE DETECTION SYSTEM AND METHOD

(71) Applicant: BGI SHENZHEN, Shenzhen (CN)

(72) Inventors: Qing Xie, Shenzhen (CN); Wei-Mao Wang, Shenzhen (CN); Wen-Wei Zhang, Shenzhen (CN); Mengzhe Shen, Shenzhen (CN)

(73) Assignee: BGI SHENZHEN, Shenzhen (CN)

( * ) Notice: Subject to any disclaimer, the term of this patent is extended or adjusted under 35 U.S.C. 154(b) by 159 days.

(21) Appl. No.: 17/913,958

(22) PCT Filed: Apr. 8, 2020

(86) PCT No.: PCT/CN2020/083738
§ 371 (c)(1),
(2) Date: Sep. 23, 2022

(87) PCT Pub. No.: WO2021/203291
PCT Pub. Date: Oct. 14, 2021

(65) Prior Publication Data
US 2023/0124060 A1   Apr. 20, 2023

(51) Int. Cl.
G02B 21/36   (2006.01)
G03H 1/04   (2006.01)
G03H 1/00   (2006.01)

(52) U.S. Cl.
CPC ......... *G02B 21/361* (2013.01); *G02B 21/367* (2013.01); *G03H 1/0443* (2013.01); *G03H 2001/005* (2013.01)

(58) Field of Classification Search
CPC ...... G02B 21/361; G02B 21/367; G02B 5/28; G02B 21/36; G03H 1/0443; G03H 2001/005
See application file for complete search history.

(56) References Cited

U.S. PATENT DOCUMENTS

| 11,841,312 B2 * | 12/2023 | Imai | ............... G01N 15/1434 |
| 2005/0003556 A1 * | 1/2005 | Nagasawa | ........... C12Q 1/6834 |
| | | | 435/6.12 |

(Continued)

FOREIGN PATENT DOCUMENTS

| CN | 101809444 A | 8/2010 |
| CN | 102508356 A | 6/2012 |

(Continued)

OTHER PUBLICATIONS

Sasagawa Kiyotaka et al: "Dual-mode lensless imaging device for digital enzyme linked immunosorbent assay", Progress in Biomedical Optisc and Imaging, SPIE—International Society for Optical Engineering, Bellingham, WA, US, vol. 8933, Mar. 18, 2014.

(Continued)

*Primary Examiner* — John R Schnurr
(74) *Attorney, Agent, or Firm* — ScienBiziP, P.C.

(57) ABSTRACT

A lens-free microscopic imaging system (11), which is used to image microbeads (15) with pattern codes, includes an illumination system (11a) and an imaging system (11b). The illumination system (11a) includes an illumination light source (111) and an excitation light source (112). The imaging system (11b) includes an image sensor (113). The illumination light source (111) is used to emit illumination light to irradiate the microbeads (15), causing the irradiated microbeads (15) to be imaged on the image sensor. The excitation light source (112) is used to emit excitation light to excite the microbeads (15) to generate specific signals. The image sensor (113) is used to collect the images of the microbeads (15) and the specific signals to generate images. The imaging system (11) does not require a lens system. The present disclosure improves a detection efficiency of the microbeads (15).

14 Claims, 6 Drawing Sheets

(56) References Cited

U.S. PATENT DOCUMENTS

| | | | |
|---|---|---|---|
| 2009/0201504 A1* | 8/2009 | Ho | B01L 3/502761 356/399 |
| 2010/0157086 A1* | 6/2010 | Segale | G02B 26/10 348/222.1 |
| 2011/0152127 A1* | 6/2011 | Ho | C12Q 1/6813 506/41 |
| 2014/0030737 A1* | 1/2014 | Holmes | G01N 21/645 435/7.1 |
| 2014/0152801 A1* | 6/2014 | Fine | G02B 21/0008 348/79 |
| 2014/0160236 A1* | 6/2014 | Ozcan | G01B 9/021 348/40 |
| 2018/0296992 A1 | 10/2018 | Di Carlo et al. | |
| 2019/0162648 A1* | 5/2019 | Fine | G02B 27/1013 |
| 2020/0309772 A1* | 10/2020 | Fine | G01N 33/5302 |
| 2022/0012850 A1* | 1/2022 | Ozcan | G06V 10/82 |

FOREIGN PATENT DOCUMENTS

| | | |
|---|---|---|
| CN | 109884018 A | 6/2019 |
| EP | 3432194 A1 | 1/2019 |
| JP | 2010-536029 A | 11/2010 |
| JP | 2015-500475 A | 1/2015 |
| JP | 2016-511831 A | 4/2016 |
| JP | 2017-538970 A | 12/2017 |
| WO | 2017/104026 A1 | 6/2017 |

OTHER PUBLICATIONS

Roy Mohendra et al: "A simple and low-cost device performing blood cell counting based on lens-free shadow imaging technique", Sensors and Actuators B: Chemical, vol. 201, Oct. 1, 2014.

Qingshan Wei et al: "On-Chip Cytometry using Plasmonic Nanoparticle Enhanced Lensfree Holography", vol. 3, Apr. 23, 2013.

* cited by examiner

LENS-FREE MICROSCOPIC IMAGING SYSTEM AND METHOD, AND BIOCHEMICAL SUBSTANCE DETECTION SYSTEM AND METHOD

FIELD

The subject matter relates to biological detection, and more particularly, to a lens-free microscopic imaging system and method, and a biochemical substance detection system and method.

BACKGROUND

At present, a lot of assays for complex samples of macromolecular usually include two steps. In the first step, molecules that can capture specific target macromolecules are attached to a surface of solid phase. Such attached molecules can capture the target macromolecules from a complex sample in various ways such as hybridization (e.g., in assays based on DNA, RNA) or interactions between antigens and antibodies (in immunoassays). In the second step, molecules required for the detection (hereinafter, "detection molecules") are incubated with and bonded to a compound of the capture molecules and the target, thereby emitting signals such as fluorescent or electromagnetic signals. The target is then quantified based on an intensity of the signals.

Multiplex detection can be carried out by a variety of capture reagents that are specific for different target macromolecules. In a chip-based array multiplex detection, each type of capture reagent is attached to a predetermined position on the chip. Multiple targets in the complex sample are quantified by measuring the signal of the detection molecule at each position of the corresponding type of capture reagent. In a suspension-array-based multiplex detection, particles or microbeads are suspended in a solution required for the detection. Such particles or microbeads include identification elements that can be embedded, printed, or otherwise generated by one or more elements of the particles or microbeads. Each type of capture reagent is fixed to particles having a same identity number, and the signal emitted by the detection molecules on the particles having a specific identity number can reflect the amount of the corresponding target. Through microscope and image recognition algorithms, the particles or microbeads can be identified, so that the signal from the molecules captured by the capture reagent is associated with the identity number to realize multiplex detection.

When particles or microbeads are smaller, a greater number of identity numbers can be detected in a single test, and a larger magnification of the microscope is required for such test. This requires the imaging system to have a large field of view and high-resolution images. Existing optical microscopes are limited by optical design principle, so a spatial bandwidth product are in the scale of millions of pixels, so high resolution and large field of view are very difficult to obtain simultaneously.

Therefore, the existing microscope can obtain clear images of the microbeads/magnetic beads and images of corresponding signals (such as fluorescent signals). However, due to the limitation of the field of view of the microscope, it is extremely difficult to observe all microbeads/magnetic beads in the field of view at one time. To traverse all of the micro-chip microbeads/magnetic beads or to ensure that there are enough microbeads/magnetic beads of a same type, it is needed to repeatedly shift the field of view. The existing optical microscope also needs to perform a lens focusing process, which is not only time-consuming and laborious, but also difficult to find a focus plane. An optical lens system and a slider for moving the field of view result in the detecting system being high cost and not portable.

SUMMARY

To overcome at least one of the above shortcomings, a lens-free microscopic imaging system and method, and a biochemical substance detection system and method are needed.

In a first aspect, the present disclosure provides a lens-free microscopic imaging system for imaging microbeads with pattern codes. The lens-free microscopic imaging system includes an illumination system and an imaging system. The illumination system includes an illumination light source and an excitation light source. The imaging system includes an image sensor. The illumination light source is configured to emit illumination light to irradiate the microbeads, causing the irradiated microbeads to be imaged on the image sensor. The excitation light source is configured to emit excitation light to excite the microbeads to generate specific signals, the image sensor is configured to collect images of the microbeads and of the specific signals.

Furthermore, the illumination light irradiates the microbeads, causing the images of the irradiated microbeads to be projected on the image sensor.

Furthermore, the illumination light further forms interference fringes on the image sensor, and the interference fringes are collected by the image sensor.

Furthermore, the illumination light source is a monochrome light source.

Furthermore, a pinhole is arranged on an optical path from the illumination light source to the microbeads.

Furthermore, the illumination light source is configured to emit the illumination light from a first orientation to a second orientation to irradiate the microbeads. The excitation light source is configured to emit the excitation light from the first orientation to the second orientation.

Furthermore, the illumination system further includes a total reflection device. The total reflection device includes a total reflection surface, and the total reflection surface is configured to reflect the excitation light emitted by the excitation light source to the microbeads.

Furthermore, the total reflection surface is arranged in the second orientation, and is configured to reflect the excitation light from the second orientation to the first orientation.

Furthermore, the illumination light source is configured to emit the illumination light from a first orientation to a second orientation to irradiate the microbeads, and the excitation light source is configured to emit the excitation light from the second orientation to the first orientation.

Furthermore, a filtering device is further included, which is in front of or on the image sensor.

In a second aspect, the present disclosure provides a lens-free microscopic imaging method for imaging microbeads with pattern codes. The microbeads are configured to capture specific biochemical substances. The lens-free microscopic imaging method including:

disposing the microbeads between an illumination light source and an image sensor, powering on the illumination light source to emit illumination light towards the microbeads, causing the microbeads to be imaged on the image sensor;

powering on the excitation light source to emit excitation light towards the microbeads, causing the specific biochemical substances to generate specific signals;

collecting images of the microbeads and the specific signals.

Furthermore, the illumination light irradiates the microbeads, causing the irradiated microbeads to be projected on the image sensor.

Furthermore, the illumination light further forms interference fringes on the image sensor, and the interference fringes are collected by the image sensor.

In a third aspect, the present disclosure provides a biochemical substance detection system, including:

the above-mentioned lens-free microscopic imaging system; and a recognition and detection device configured to receive the images output by the image sensor, recognize the microbeads in the images, an identity number of each of the microbeads, and an amount of the specific biochemical substances captured by each type of microbead, the microbeads with a same identity number are classified into one type of microbead.

Furthermore, the recognition and detection device includes a recognition and detection system. The recognition and detection system includes a microbead recognition module and a biochemical substance detection module. The microbead recognition module is configured to recognize the microbeads in the images, the pattern codes of each of the microbeads, and the identity number of each of the microbeads according to a sequence of the pattern codes of each of the microbeads. The biochemical substance detection module is configured to detect in the images an intensity of one of the specific signals sent by each type of microbead, and detect an amount of one of the specific biochemical substances captured by each type of microbead according to the intensity of the specific signal.

Furthermore, the recognition and detection system also includes an image reconstruction module, the image reconstruction module is configured to reconstruct the images output by the image sensor, and output reconstructed images to the microbead recognition modules.

Furthermore, the image reconstruction module uses a digital holographic reconstruction technology to reconstruct the images.

Furthermore, the recognition and detection system further includes a machine learning module. The machine learning module is configured to automatically learn recognition results from the recognition module and extract characteristic values for subsequent recognitions by the recognition module.

In a fourth aspect, the present disclosure provides a biochemical substance detection method, including:

performing the above-mentioned lens-free microscopic imaging method to output images; and receiving the images, recognizing the microbeads in the images, an identity number of each of the microbeads, and an amount of specific biochemical substances captured by each type of microbead, wherein all magnetic microbeads with a same identity number are classified into one type of microbead.

Furthermore, in the biochemical substance detection method, recognizing the microbeads in the images, an identity number of each of the microbeads, and an amount of specific biochemical substances captured by each type of microbead further includes recognizing the microbeads in the images, pattern codes of each of the microbeads, and the identity number of each of the microbeads according to a sequence of the pattern codes of each of the microbeads; and detecting in the images an intensity of one of the specific signals sent by each type of microbead, and detecting an amount of one of the specific biochemical substances captured by each type of microbead according to the intensity of the specific signal.

Furthermore, in the biochemical substance detection method, before recognizing the microbeads in the images, an identity number of each of the microbeads, and an amount of specific biochemical substances captured by each type of microbead, the method further includes reconstructing the images output by the image sensor, or reconstructing the images output by the image sensor by a digital holographic reconstruction technology.

Furthermore, the biochemical substance detection method further including automatically learning recognition results and detection results during the recognizing and detecting process and extracting characteristic values.

The lens-free microscopic imaging system and method and the biochemical substance detection system and method according to the embodiment of the present disclosure are used to replace the existing optical microscope to detect the pattern-coded microbeads. The processes of lens focusing and repeatedly shifting the field of view when using the existing optical microscope are avoided. The image processing is only needed to achieve ultra-high resolution, so the imaging speed is faster. Since the optical lens system is omitted, the lens-free microscopic imaging system is more compact and the cost is lower. The field of view is larger. All the pattern-coded microbeads in the reaction vessel can be traversed without the need to rotate the field of view by a slider mechanism.

BRIEF DESCRIPTION OF THE DRAWINGS

Implementations of the present technology will now be described, by way of embodiment, with reference to the attached figures. Obviously, the drawings are only some embodiments of the present disclosure. For those of ordinary skill in the art, other drawings can be obtained based on these drawings without creative work.

Figure 1:
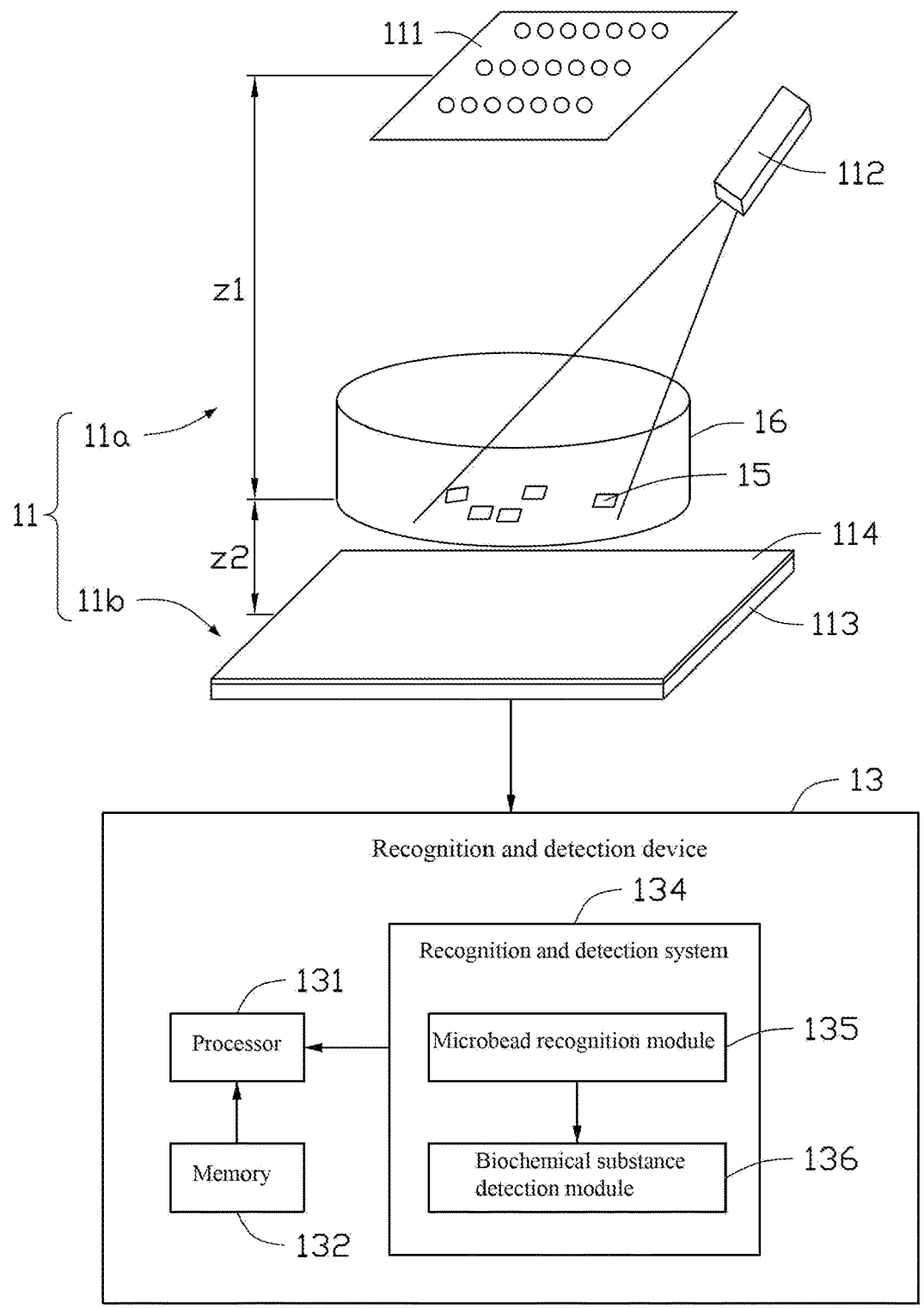
FIG. 1 is a diagrammatic view of a biochemical substance detection system according to embodiment 1 of the present disclosure.

SYMBOLS OF MAIN COMPONENTS biochemical substance detection system 1, 2, or 3; illumination system 11*a*, 21*a*, or 31*a*
lens-free microscopic imaging system 11, 21, or 31; imaging system 11*b*, 21*b*, or 31*b* recognition and detection device 13, 23, 33, 43, or 53; illumination light source 111, 211, or 311
excitation light source 112, 212, or 312; image sensor 113, 213, or 313
microbead 15, 25, or 35; filtering device 114, 214, or 314
fluorescent reaction vessel 16; processor 131, 231, 331, 431, or 531
memory 132, 232, 332, 432, or 532; recognition and detection system 134, 234, 334, 434, or 534
microbead recognition module 135, 235, 335, 435, or 535; biochemical substance detection module 136, 236, 336, 436, or 536
total reflection device 317; total reflection surface 3171
image reconstruction module 437; machine learning module 537
Steps S61-S65

DETAILED DESCRIPTION

Implementations of the disclosure will now be described, by way of embodiments only, with reference to the drawings. The described embodiments are only portions of the embodiments of the present disclosure, rather than all the embodiments. The disclosure is illustrative only, and changes may be made in the detail within the principles of the present disclosure. It will, therefore, be appreciated that the embodiments may be modified within the scope of the claims.

It should be noted that when a component is considered to be "arranged on" another component, the component can be arranged directly on another component, or there may be an intermediate components therebetween. The term "and/or" as used herein includes all or any combination of one or more related listed items.

Some existing microbeads, such as magnetic beads, have opaque substances or fluorescent substances marked therein. Pattern codes with different depths, shapes, and/or intervals are engraved around such microbead. All or a portion of the pattern codes are combined to form an identity number of the microbead. After microscopic imaging, the identity number of the microbead can be obtained by recognizing the pattern codes and their combinations engraved on the microbead. By exciting a fluorescent substance to emit light and detecting the intensity of the fluorescent light, an amount of a specific biochemical substance can be quantified.

Embodiment 1

Referring to FIG. 1, a biochemical substance detection system is provided according to a first embodiment of the present disclosure. The biochemical substance detection system 1 is used to detect pattern-coded microbeads 15 to obtain an amount of specific biochemical substances captured by the pattern-coded microbeads 15. The biochemical substance detection system 1 includes a lens-free microscopic imaging system 11 and a recognition and detection device 13. The lens-free microscopic imaging system 11, through microscopic imaging of the microbeads 15, is used to obtain images of the microbeads 15 and signals emitted by the microbeads 15. The recognition and detection device 13 is used to recognize the microbeads 15 and the identity numbers of the microbeads 15 from the images, and detect from the images an amount of the specific biochemical substance captured by each type of microbead 15.

The lens-free microscopic imaging system 11 includes an illumination system 11a and an imaging system 11b. The illumination system 11a includes an illumination light source 111 and an excitation light source 112. The imaging system 11b includes an image sensor 113. The illumination light source 111 is used to emit illumination light to irradiate the microbeads 15, so that the irradiated microbeads 15 are projected onto the image sensor 113 to form the images. The excitation light source 112 is used to emit excitation light to irradiate the microbeads 15, and the specific biochemical substances captured by the microbeads 15 are excited by the excitation light to respond with signals towards the image sensor 113 to form the images. In order to prevent leakage of a portion of the excitation light onto the image sensor 113, in this embodiment, a filtering device 114 matching a wavelength of the excitation light is arranged in front of the image sensor 113. The filtering device 114 can be a filter device or a filter plate. The imaging system 11b does not require a lens system of lenses. That is, a lens system is not provided between the image sensor 113 and the microbeads 15.

In this embodiment, the microbeads 15 are pattern-coded magnetic beads of a transparent material. The microbeads 15 are placed in a fluorescent reaction container 16. Generally, in order to realize multiplex detection, various types of microbeads 15 are placed in the fluorescent reaction container 16, and each type of microbead 15 has a same sequence of the pattern codes. Therefore, each type of microbead 15 has a same identity number, and different types of microbeads 15 have different identity numbers. Each type of microbead 15 captures a biochemical substance, and different types of microbeads 15 can capture different biochemical substances. When a type of microbead 15 captures a specific biochemical substance, the specific biochemical substance captured by the microbeads 15 is excited by the excitation light from the excitation light source 112 and generates a fluorescent signal. By detecting the intensity of the fluorescent signal from each type of microbead 15, the amount of the specific biochemical substance captured by such type of microbead 15 is quantified.

In this embodiment, the microbeads 15 are arranged so that a first orientation and a second orientation are defined. The illumination light source 111 and the excitation light source 112 are both arranged in the first orientation of the microbeads 15. The filtering device 114 and the image sensor 113 are arranged in the second orientation of the microbeads 15. The illumination light source 111 is a point light source or a light source array with limited spatial coherence (i.e., low spatial coherence). An imaging method performed by the lens-free microscopic imaging system 11 includes following steps. The illumination light source 111 is powered on, which irradiates the microbeads 15 from the first orientation to the second orientation, and the irradiated microbeads 15 are projected onto the image sensor 113. At the same time, the excitation light source 112 is powered on, which emits the excitation light from the first orientation to the second orientation to irradiate the microbeads 15, causing the microbeads 15 to emit the fluorescent signals toward the image sensor 113. The image sensor 113 collects the projections and the fluorescent signals of the microbeads 15, and generates the images of the microbeads 15 and the fluorescent signals. The images are output to the recognition and detection device 13. The recognition and detection device 13 recognizes the images to obtain the identity number of each type of microbead 15, and to detect the amount of the specific biochemical substance captured by each type of microbead 15. Specifically, the recognition and detection device 13 is a computer device. The recognition and detection device 13 includes a processor 131, a memory 132, and a computer program stored in the memory 132 and executed by the processor 131, such as a recognition and detection system 134. The recognition and detection system 134 is divided into a plurality of functional modules, such as a microbead recognition module 135 and a biochemical substance detection module 136, according to its functions. The microbead recognition module 135 is used to recognize the microbeads 15 in the images and the identity numbers of the microbeads 15. Specifically, the microbead recognition module 135 recognizes the microbeads 15 according to pre-built models or preset characteristics, recognizes the pattern codes of the microbeads 15 according to the pre-built models or preset characteristics, and finally recognizes the identity numbers of the microbeads 15 according to the sequences of the pattern codes of the microbeads 15. The biochemical substance detection module 136 is used to detect the intensity of the signal from each type of microbead 15 in the images, and detect the amount of the specific biochemical substance captured by each type of microbead 15 according to the intensity of the signal.

The biochemical substance detection system 1 and detection method in this embodiment are applicable to the detection of pattern-coded beads, such pattern-coded beads which have sizes of 500 μm to 1 mm, and a distance between two feature points of the pattern codes is 50 μm or more. Assuming that a distance between the illumination light source 111 and the microbeads 15 is z1, a distance between the microbeads 15 and the image sensor 113 is z2. The light carrying the information of the microbeads 15, propagating over the distance z2, is captured by the image sensor 113. In the existing process of semiconductors, a pixel size of the image sensor 113 is generally large (a smallest pixel size at present is about 0.8 μm). Thus, in this embodiment, pixelation exists when the image sensor 113 uses projection imaging (the projection imaging forms the images by the projections of the microbeads 15). Furthermore, defocus information of the microbeads 15 is directly obtained. Thus, the recognition and detection device 13 only needs the projection information of the microbeads 15 to recognize the identity numbers of the microbeads 15, without the need for reconstruction of focus information of the microbeads 15 from under-sampling images.

Embodiment 2

Figure 2:
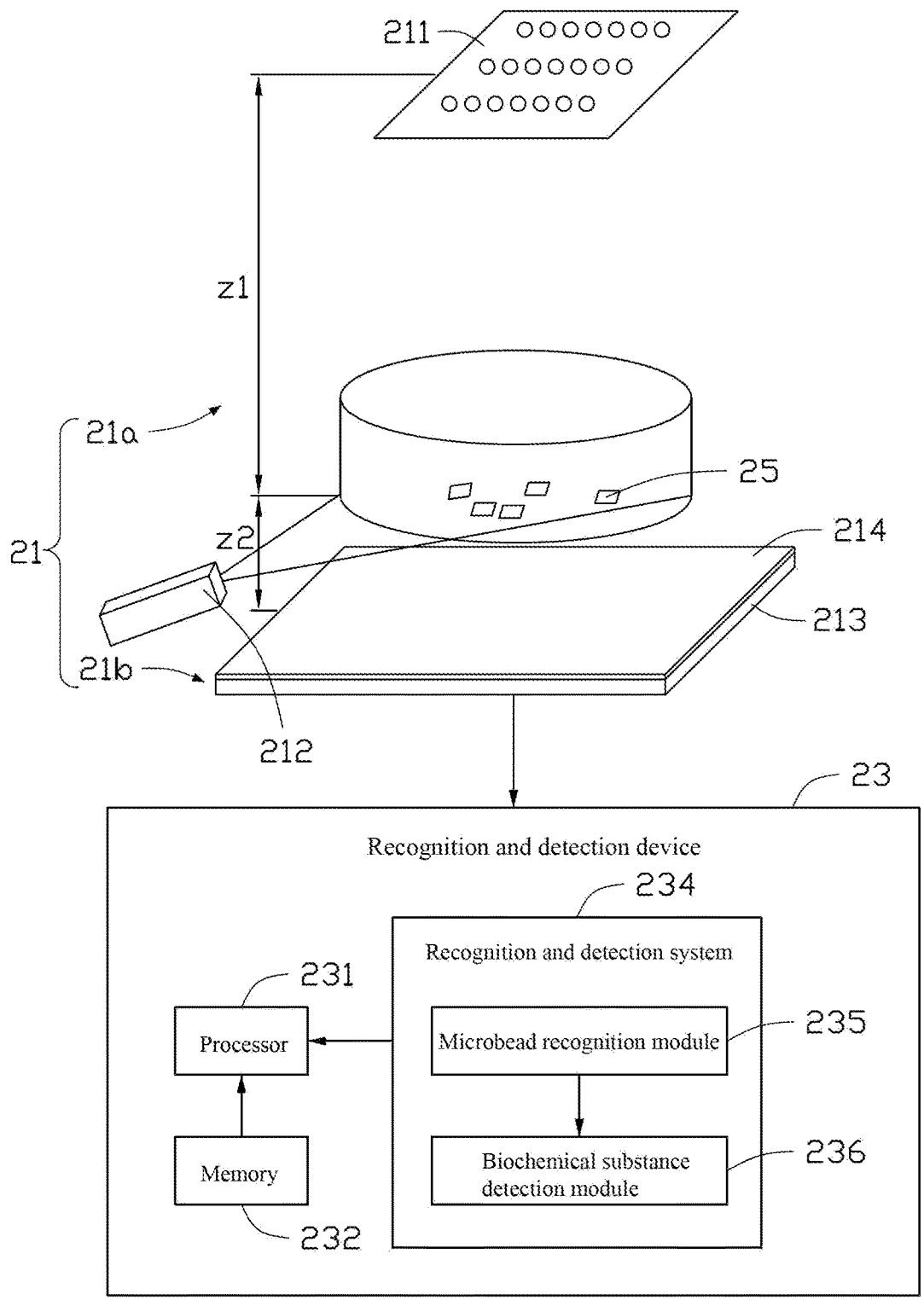
FIG. 2 is a diagrammatic view of a biochemical substance detection system according to embodiment 2 of the present disclosure.

Referring to FIG. 2, a biochemical substance detection system 2 is provided according to a second embodiment of the present disclosure. The biochemical substance detection system 2 is used to detect pattern-coded microbeads 25 to quantify an amount of specific biochemical substances captured by the pattern-coded microbeads 25. The biochemical substance detection system 2 includes a lens-free microscopic imaging system 21 and a recognition and detection device 23. The lens-free microscopic imaging system 21 is used to obtain images of the microbeads 25 and signals emitted by the microbeads 25 through microscopic imaging of the microbeads 25. The recognition and detection device 23 is used to recognize the microbeads 25 in the images and the identity numbers of the microbeads 25, and detect the amount of a specific biochemical substance captured by each type of microbead 25.

The lens-free microscopic imaging system 21 includes an illumination system 21a and an imaging system 21b. The illumination system 21a includes an illumination light source 211 and an excitation light source 212. The imaging system 21b includes an image sensor 213 and a filtering device 214 arranged in front of the image sensor 213. The illumination light source 211 is a point light source or a light source array with limited spatial coherence. The illumination light source 211 is used to emit illumination light to irradiate the microbeads 25, and the irradiated microbeads 25 are projected onto the image sensor 213 to form the images. In this embodiment, the microbeads 25 are made of an opaque material, or a wavelength of light passing through the microbeads 25 is not within a detection range of the image sensor 213. The microbeads 25 are arranged so that a first orientation and a second orientation are defined. The illumination light source 211 is arranged in the first orientation. The excitation light source 212, the image sensor 213, and the filtering device 214 are arranged in the second orientation. The illumination light source 211 emits the illumination light from the first orientation to the second orientation, which irradiates the microbeads 25 so that the irradiated microbeads 25 are projected onto the image sensor 213. At the same time, the excitation light source 212 irradiates the microbeads 25 from the second orientation to the first orientation, so that the excitation microbead 25 generates a fluorescent signal that is projected onto the image sensor 213. A lens system is not included in the imaging system 21b. That is, the lens system is not provided between the image sensor 213 and the microbeads 25. The image sensor 213 directly collects the projections and the fluorescent signals of the microbeads 25, and generates the images of the microbeads 25 and the fluorescent signals. The images are output to the recognition and detection device 23. The recognition and detection device 23 recognizes the images to obtain the identity number of each type of microbead 25, and to detect the amount of the specific biochemical substance captured by each type of microbead 25. The configuration of the recognition and detection device 23 can refer to embodiment 1, which will not be repeated.

The biochemical substance detection system 2 and detection method in this embodiment are applicable to the detection of microbeads 25, such microbeads 25 which have sizes of 500 μm to 1 mm, and a distance between two feature points of the pattern codes is 50 μm or more.

Embodiment 3

Figure 3:
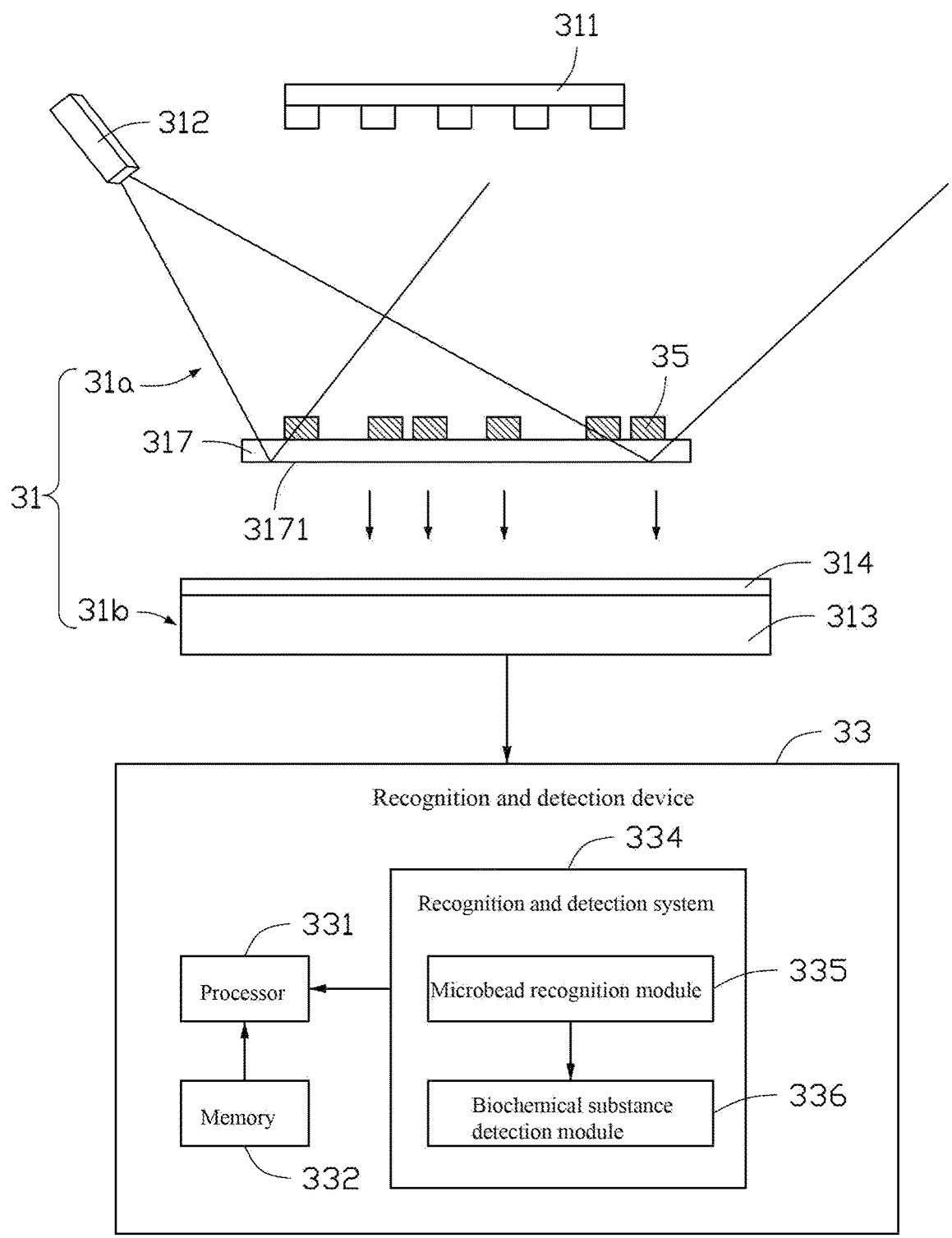
FIG. 3 is a diagrammatic view of a biochemical substance detection system according to embodiment 3 of the present disclosure.

Referring to FIG. 3, a biochemical substance detection system 3 is provided according to a third embodiment of the present disclosure. The biochemical substance detection system 3 is used to detect pattern-coded microbeads 35 to quantify an amount of specific biochemical substances captured by the pattern-coded microbeads 35. The biochemical substance detection system 3 includes a lens-free microscopic imaging system 31 and a recognition and detection device 33. The lens-free micro imaging system 31, through microscopic imaging of the microbeads 35, is used to obtain images of the identity numbers of the microbeads 35 and signal emitted by the microbeads 35. The recognition and detection device 33 is used to recognize the microbeads 35 in the images and the identity numbers of the microbeads 35, and to detect the amount of the specific biochemical substance captured by each type of microbead 35.

The lens-free microscopic imaging system 31 includes an illumination system 31a and an imaging system 31b. The illumination system 31a includes an illumination light source 311, an excitation light source 312, and a total reflection device 317. The imaging system 31b includes an image sensor 313 and a filtering device 314. The illumination light source 311 is a point light source or a light source array with limited spatial coherence. The microbeads 35 are pattern-coded microbeads of an opaque material, or a wavelength of light that the microbeads 35 can project is not within a detection range of the image sensor 313. The microbeads 35 are arranged so that a first orientation and a second orientation are defined. The illumination light source 311 and the excitation light source 312 are arranged in the first orientation. The image sensor 313, the filtering device 314, and the total reflection device 317 are arranged in the second orientation. The filtering device 314 is arranged in front of the image sensor 313. The total reflection device 317 is arranged in front of the filtering device 314. The illumination light source 311 emits the illumination light from the first orientation to the second orientation to irradiate the microbeads 35, and the irradiated microbeads 35 are projected onto the image sensor 313. The excitation light source 312 emits the excitation light from the first orientation to the second orientation to irradiate the microbeads 35, causing the microbeads 35 to emit the fluorescent signals to the image sensor 313. The total reflection device 317 is arranged behind the microbeads 35. The total reflection device 317 has a total reflection surface 3171. In this embodiment, the total reflection surface 3171 reflects the excitation light and allows the illumination light to pass through, causing the excitation light to irradiate a side of the microbeads 35 facing the image sensor 313. Thus, capture reagents on such side generate fluorescent signals. The fluorescent signals from the microbeads 35 are projected to and recorded on the image sensor 313. The image sensor 313 generates the images of the microbeads 35 and the fluorescent signals. The images are output to the recognition and detection device 33. The recognition and detection device 33 recognizes the images to obtain the identity number of each type of microbead 35, and to detect the amount of the specific biochemical substance captured by each type of microbead 35. The setting of the recognition and detection device 33 can refer to embodiment 1, which will not be repeated.

It can be understood that in other embodiments, not all parts of the total reflection device 317 must be behind the microbeads 35. Only at least a portion of the total reflection surface 3171 is required to be behind the microbeads 35.

A distance z2 between the microbeads 35 and the image sensor 313 is a key factor of imaging quality. Compared with the second embodiment, arranging the excitation light source 32 in the first orientation can reduce the distance z2 between the microbeads 35 and the image sensor 33, so that the images of the projections of the microbeads 35 and the fluorescent signals are clearer.

The biochemical substance detection system 3 and detection method in this embodiment are applicable to the detection of pattern-coded microbeads 35, such microbeads 35 have sizes of 500 μm to 1 mm, and a distance between two feature points of the pattern codes is 50 μm or more.

Embodiment 4

Figure 4:
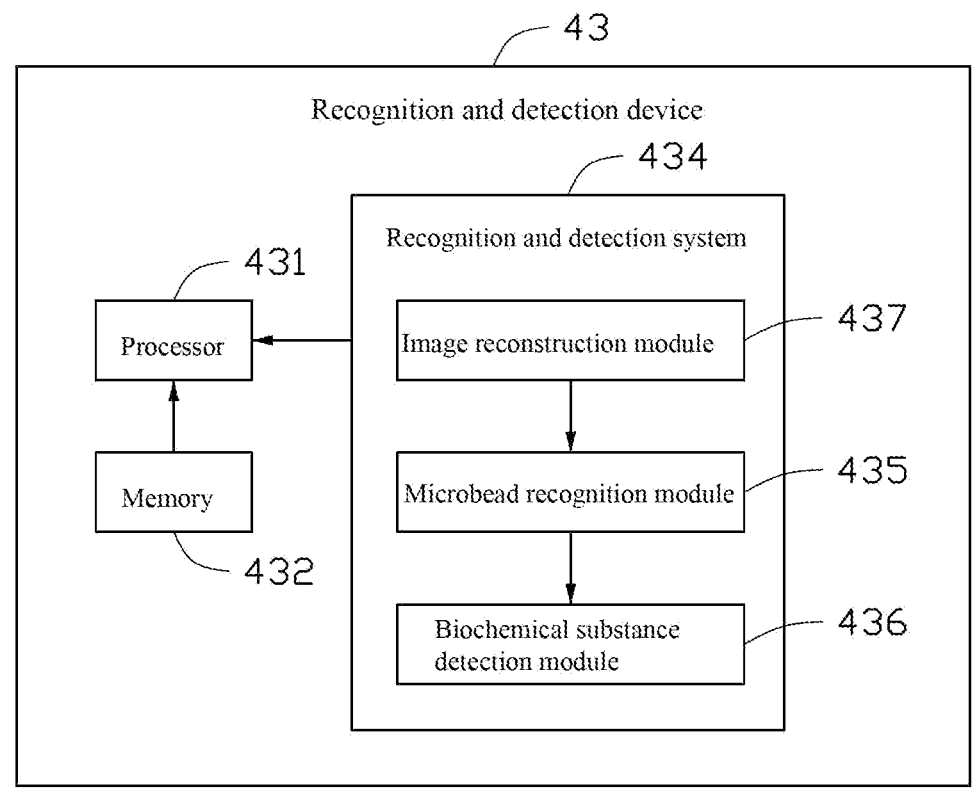
FIG. 4 is a diagrammatic view of a recognition and detection device of a biochemical substance detection system according to embodiment 4 of the present disclosure.

In this embodiment, a lens-free microscopic imaging system uses an illumination light source with good spatial coherence and time coherence (i.e., high spatial coherence and high time coherence) is used to irradiate microbeads. Interference fringes are formed on an image sensor. The image sensor collects the interference fringes and fluorescent signals excited by an excitation light source, and generates images that are transmitted to a recognition and detection device. Referring to FIG. 4, the recognition and detection device 43 includes a processor 431, a memory 432, and a computer program stored in the memory 432 and executed by the processor 431, such as a recognition and detection system 434. In this embodiment, the recognition and detection system 434 includes a microbead recognition module 435, a biochemical substance detection module 436, and an image reconstruction module 437. The image reconstruction module 437 is used to reconstruct the images output by the image sensor to obtain reconstructed images with higher resolutions. The microbead recognition module 435 is used to recognize the microbeads in the reconstructed images and the identity number of the microbeads. The biochemical substance detection module 436 is used to detect the intensity of the signal from each type of microbead in the reconstructed images, and detect the amount of specific biochemical substance captured by each type of microbead according to the intensity of the signal.

Specifically, the image reconstruction module 437 applies calculations to the interference fringes to obtain intensity information and phase information of the microbeads at a focus plane, thereby obtaining the identity numbers of the microbeads. The focus plane refers to a plane wherein clear images of the microbeads can be formed. The focus plane is a fictitious plane, not the focusing plane inside a traditional lens.

Images $U(x,y)$ collected by the image sensor are formed by interferences between light $U_0(x,y)$ scattered by the microbeads (object light) and reference light $U_R(x,y)$ directly passing through a transparent substrate and the filter without interference:

$$U(x,y)=U_0(x,y)+U_R(x,y)=A_R+A_0(x,y)\exp[i\cdot\varphi_0(x,y)]$$

Wherein, $A_R$ and $A_0(x,y)$ are respectively the amplitude information of the reference light and the amplitude information of the object light (from microbeads), and $\varphi_0(x,y)$ is the phase information of the object light (from microbeads). In this embodiment, the image reconstruction module 437 uses a digital holographic reconstruction technology to recover the amplitude and phase information of the object light (from microbeads) based on light intensity information $I(x,y)$ directly collected by the image sensor. The transparent substrate refers to a medium between the total reflection device and the filtering device.

The image reconstruction module 437 uses digital holographic reconstruction technology to reconstruct the images obtained by the image sensor through algorithms. The reconstruction mainly includes: (1) phase recovery or conjugate image elimination, which are mainly used to eliminate diffraction effect caused by a spacing between the microbeads and the sensor; (2) super resolution imaging, which is mainly used to overcome a reduction of resolution caused by a pixel size of the image sensor, thereby achieving sub-pixel resolution without any lens. The two steps can be carried out in sequence, or carried out simultaneously by a phasor propagation method. The phasor propagation method can realize the super-resolution of pixels and phase recovery for the lens-free microscope images, and then realize image reconstruction. For an LED light source with poor spatial coherence, the spatial resolution of the reconstructed images can be further improved by a combination of the phasor propagation method and a point spread function deconvolution method.

In this embodiment, the following technical solutions can be used to obtain an illumination light source with good spatial coherence and temporal coherence.

1. A monochrome laser or a monochrome uniform laser is used as the illumination light source;

2. A monochrome LED or a monochrome light source is used as the illumination light source to improve time coherence;

3. A pinhole is arranged along a light path of monochrome laser, monochrome LED, or monochrome light source to improve spatial coherence;

4. The intensity of light from the illumination light source and a distance from the illumination light source to the microbeads are both increased.

The above technical solutions can be combined according to needs.

In addition to the use of a different illumination light source, the position of the illumination light source, and the position and function of other components in the lens-free microscopic imaging system in this embodiment can refer to any of the above-mentioned embodiments. For example, for transparent microbeads, the illumination light source, the excitation light source, the image sensor, and filtering device can be set with reference to embodiment 1. For opaque microbeads or microbeads through which a wavelength of light is not within the detection range of the image sensor, the illumination light source, the excitation light source, the image sensor, and the filtering device can be set with reference to embodiment 2, or the illumination light source, the excitation light source, the image sensor, the filtering device, and the total reflection device can be set with reference to embodiment 3.

Compared with the above-mentioned embodiment that use a point light source or a light source array with limited spatial coherence to irradiate the microbeads for projection imaging, in this embodiment, the illumination light source with good spatial and temporal coherence is used to irradiate the microbeads to generate interference fringes. The digital holographic reconstruction image technology is then used to obtain the identity numbers of the microbeads, this has higher resolution and more accurate recognition.

Embodiment 5

The lens-free microscopic imaging system in this embodiment can refer to embodiments 1 to 3. The differences are mainly in respect of the recognition and detection device and the imaging method.

In this embodiment. Fourier laminated imaging is used to replace the above projection imaging to recognize the identity numbers of the microbeads. In this embodiment, the excitation light source is used to excite the microbeads to emit fluorescent signals. The fluorescent signals are collected by the image sensor and finally recognized by a specific computer device to quantify the amount of the captured specific molecules.

Embodiment 6

In the above-mentioned embodiments 1 to 4, accurate modeling for each step is needed in order to recognize the pattern codes of the microbeads and the identity numbers of the microbeads. The above-mentioned "each step" generally includes the placement of optical elements, modeling of the light sources and the illumination process, modeling of the detected objects, or modeling of the imaging process. In this embodiment, in addition to the use of the biochemical substance detection system in any one of embodiments 1 to 5 to perform the biochemical substance detection, the biochemical substance detection system also includes a machine learning function, which automatically learns from each detection result to extract different characteristic values for the biochemical substance detection system to perform subsequent detections.

Figure 5:
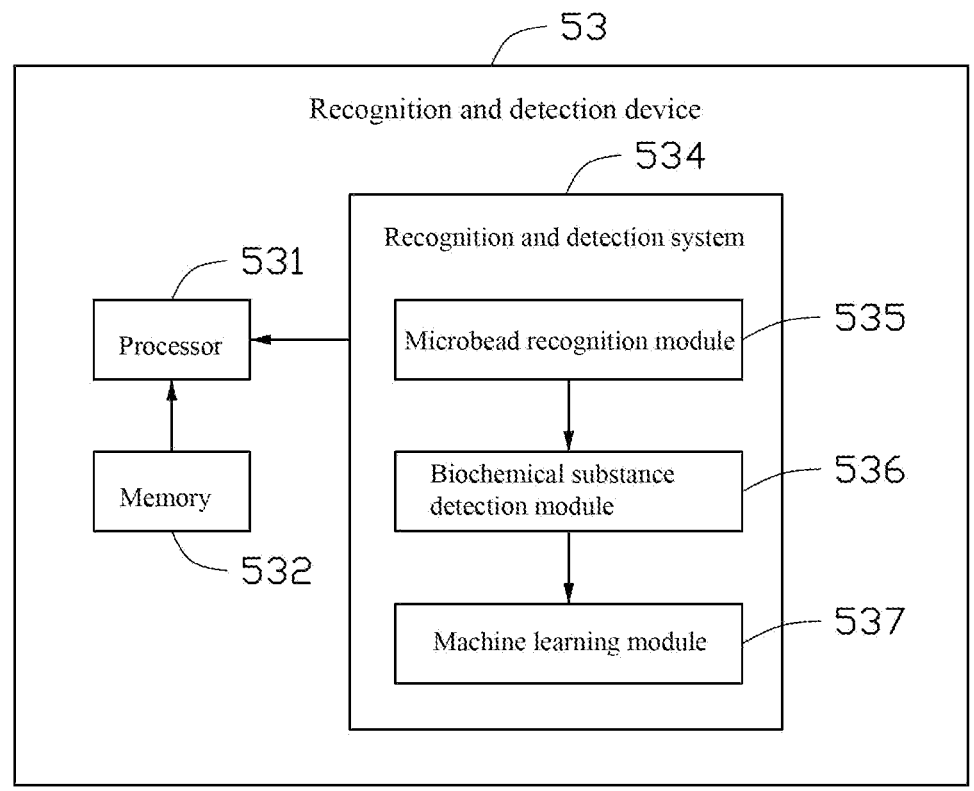
FIG. 5 is a diagrammatic view of a recognition and detection device of a biochemical substance detection system according to embodiment 6 of the present disclosure.

Referring to FIG. 5, the recognition and detection device 53 includes a processor 531, a memory 532, and a computer program stored in the memory 532 and executed by the processor 531, such as a recognition and detection system 534. In this embodiment, the recognition and detection system 534 includes a microbead recognition module 535, a biochemical substance detection module 536, and a machine learning module 537. The microbead recognition module 535 and the biochemical substance detection module 536 basically have the same functions as those of the microbead recognition module 135 and the biochemical substance detection module 136 in embodiment 1, which will not be repeated. The machine learning module 537 is used to apply a machine learning method, such as a supervised learning method or an unsupervised learning method, to train through a large number of data sets, thereby realizing the extraction of a large number of characteristic values and the pattern codes of the microbeads. By adding the machine learning module 537, the biochemical material detection system automatically learns from each detection result to obtain the characteristic values. Thus, accurate modeling for each step of the entire imaging process is avoided. The recognition, segmentation, extraction, and counting of the microbeads in a large field of view, as well as the recognition and counting of identity numbers of the microbeads are realized. The supervised learning method substantially includes data pre-processing, neural network construction, network training, and optimal solution preserving.

Embodiment 7

Figure 6:
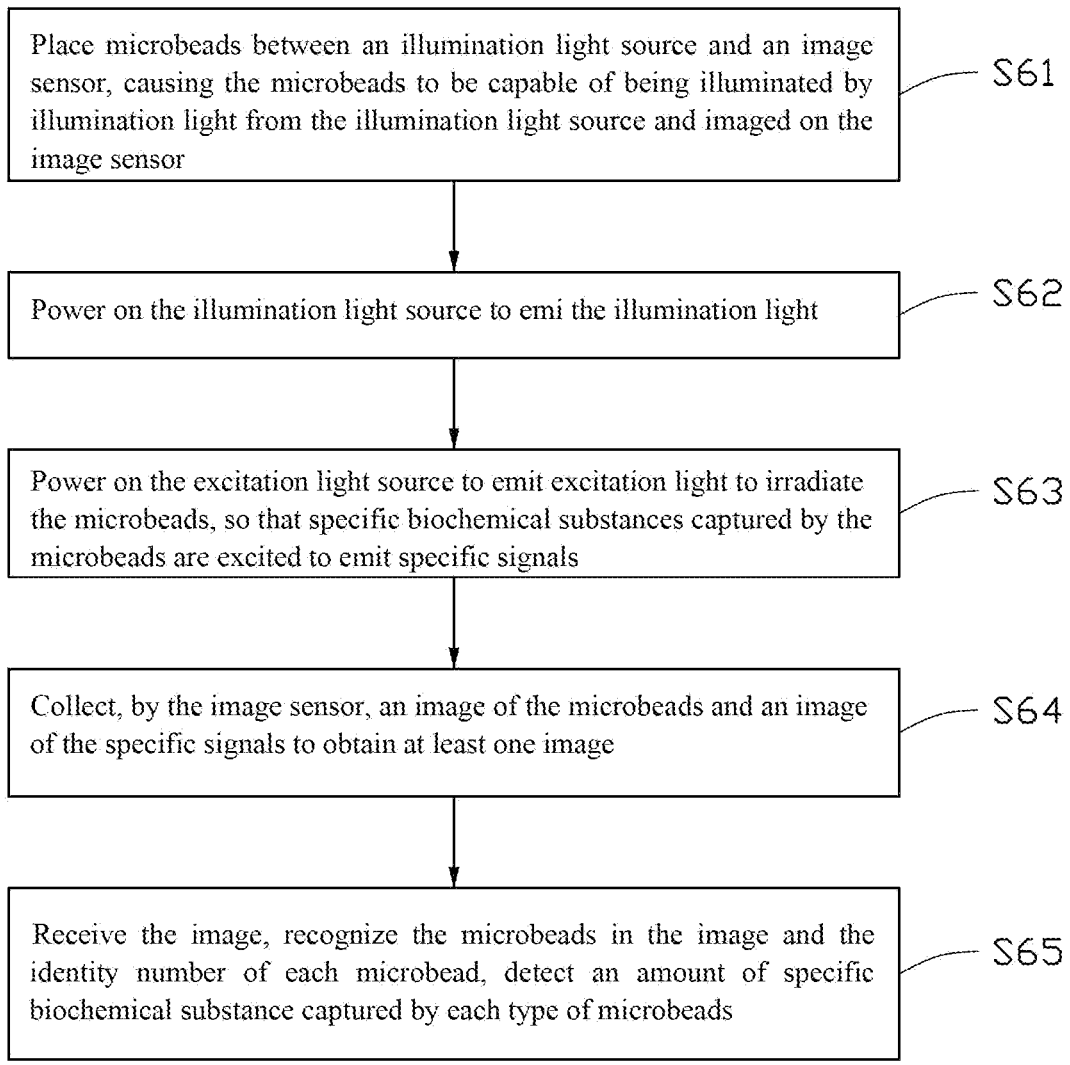
FIG. 6 is the flowchart of a biochemical substance detection method according to embodiment 7 of the present disclosure.

Referring to FIG. 6, a flowchart of a biochemical substance detection method is provided according to a seventh embodiment of the present disclosure. The sequence of some steps in the flowchart may be changed, and some steps may be omitted. For convenience of explanation, only the parts related to the embodiments of the present disclosure are shown.

In this embodiment, the biochemical substance detection method is used to form images of microbeads having pattern codes. The microbeads are used to capture specific biochemical substances. The biochemical substance detection method includes a lens-free microscopic imaging method and a recognition and detection method.

The lens-free microscopic imaging method include following steps.

Step S61, the microbeads are placed between the illumination light source and the image sensor, causing the microbeads to be capable of being illuminated by illumination light from the illumination light source and project their own images on the image sensor.

Step S62, the illumination light source is powered on, which emits the illumination light.

Step S63, the excitation light source is powered on, which emits the excitation light to irradiate the microbeads, so that the specific biochemical substances captured by the microbeads or the biochemical substances generated during the capture process are excited to emit specific signals. The above capture process will generally initialize a series of biochemical reaction processes. The capture process includes but is not limited to a one-step method, sandwich method, or quenching method.

Step S64, the image sensor collects an image of the microbeads and an image of the specific signals. Thus, the images of at least two channels are obtained.

The recognition and detection method include following steps.

Step S65, the images are received. The microbeads in the images and the identity number of each of the microbeads are recognized. The amount of specific biochemical substance captured by each type of microbead is also detected. The microbeads with a same identity number are classified into a single type.

Step S65 may specifically include following steps. The images are received. Then, the microbeads in the images and the identity number of each microbead are recognized in one channel. The position and intensity of the fluorescent signals are recognized in the other channel. The position of the fluorescent signals is registered with the position of the microbeads, or the images of the two channels are registered. The identity number of each microbead, and the presence or absence of the corresponding specific signal and the intensity of such signal are detected. The microbeads with the same identity number are classified into a single type. Through the corresponding signal of multiple microbeads classified in a same type, the intensity and distribution of the signal from this type of microbeads are determined after multiple sampling process.

In another embodiment, the lens-free microscopic imaging method of the biochemical substance detection method also includes configuring the illumination light source as a point light source or a light source array with low spatial coherence.

In another embodiment, the lens-free microscopic imaging method of the biochemical substance detection method also includes irradiating the microbeads by the illumination light emitted by the illumination light source, so that the microbeads are projected on the image sensor.

In another embodiment, the lens-free microscopic imaging method of the biochemical substance detection method also includes configuring the illumination light source to have high temporal coherence and high spatial coherence.

In another embodiment, the lens-free microscopic imaging method of the biochemical substance detection method also includes irradiating the microbeads by the illumination light emitted by the illumination light source, thereby forming interference fringes on the image sensor. The interference fringes are then collected by the image sensor.

In another embodiment, the recognition and detection method of the biochemical substance detection method specifically includes recognizing the microbeads in the images and the pattern codes of each microbead. The identity number of each microbead is recognized according to the sequence of the pattern codes of each microbead. The intensity of the specific signal generated by each type of microbead in the images is detected. The amount of the specific biochemical substance captured by each type of microbead is then detected according to the intensity of the specific signal.

In another embodiment, before "recognizing the microbeads in the images and the identity number of each microbead and detecting the amount of specific biochemical substances captured by each type of microbead", the recognition and detection method of the biochemical substance detection method also includes reconstructing the images output by the image sensor, or reconstructing the images output by the image sensor through a digital holographic reconstruction technology.

In another embodiment, the recognition and detection method of the biochemical substance detection method also includes automatically learning various results of recognition and detection during the recognition and detection processes, and extracting the characteristic values.

In the above-mentioned embodiments 1 to 7, in order to further improve the imaging resolution, the following technical solutions or a combination thereof can be used as needed.

1. The distance between the filtering device and the image sensor is reduced. For example, the filtering device can be arranged on the image sensor, causing the pixels of the filtering device to correspond one-to-one to the pixels of the image sensor. Thus, the distance $z2$ from the microbeads to the image sensor is reduced;

2. Optical fiber arrays closely arranged are used to relay the excitation light;

3. When a mask of nanostructures is arranged close to the microbeads (the object to be detected), the point spread function of the whole optical system is no longer space invariant but depends on the mask of nanostructures. Specifically, the point spread function can form specific patterns and rules, making the image processing more convenient and the positioning more accurate.

4. Excitation points that are precisely and closely arranged and the Talbot effect are used to improve the resolution;

5. In the process of image reconstruction, a deconvolution calculation method, such as Lucy Richardson algorithms, is used to improve the resolution.

Therefore, the lens-free microscopic imaging system and method and the biochemical substance detection system and method according to the embodiment of the present disclosure are used to replace the existing optical microscope to detect the pattern-coded microbeads. The processes of lens focusing and repeatedly shifting the field of view when using the existing optical microscope are avoided. The image processing is only needed to achieve ultra-high resolution, so the imaging speed is faster. Since the optical lens system is omitted, the lens-free microscopic imaging system is more compact and the cost is lower. The field of view is larger. All the pattern-coded microbeads in the reaction vessel can be traversed without the need to rotate the field of view by a slider mechanism.

Finally, even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A lens-free microscopic imaging system for imaging microbeads, each of the microbeads having opaque substances or fluorescent substances marked therein, each of the microbeads further having pattern codes with different depths, shapes, and/or intervals engraved around the microbead, all or a portion of the pattern codes being combined to form an identity number of each of the microbeads, the lens-free microscopic imaging system comprising:

an illumination system; and an imaging system;

wherein the illumination system comprises an illumination light source, an excitation light source, and a total reflection device, the imaging system comprises an image sensor, the illumination light source and the excitation light source are located at a first orientation, the total reflection device and the image sensor are located at a second orientation, the total reflection device is located between the microbeads and the image sensor; the illumination light source is configured to emit illumination light from the first orientation to the second orientation to irradiate the microbeads, causing projections of the irradiated microbeads to be imaged on the image sensor, the excitation light source is configured to emit excitation light from the first orientation to the second orientation, the total reflection device comprises a total reflection surface facing the image sensor, the total reflection surface is configured to allow the illumination light to pass through, and further configured to reflect the excitation light emitted by the excitation light source to the microbeads to excite the microbeads to generate specific signals, the image sensor is configured to collect images of the microbeads and of the specific signals, wherein each type of microbeads has a same identity number, each type of microbeads captures a biochemical substance, different types of microbeads capture different biochemical substances, the identity number of the microbead is recognizable by the pattern codes in the images, and an amount of a specific biochemical substance captured by each type of microbeads is quantified by an intensity of the specific signals in the images.

2. The lens-free microscopic imaging system according to claim 1, wherein the illumination light irradiates the microbeads, causing the images of the irradiated microbeads to be projected on the image sensor.

3. The lens-free microscopic imaging system according to claim 1, wherein the illumination light further forms interference fringes on the image sensor, and the interference fringes are collected by the image sensor.

4. The lens-free microscopic imaging system according to claim 3, wherein the illumination light source is a monochrome light source.

5. The lens-free microscopic imaging system according to claim 4, wherein a pinhole is arranged on an optical path from the illumination light source to the microbeads.

6. The lens-free microscopic imaging system according to claim 1, further comprising a filtering device in front of or on the image sensor.

7. A lens-free microscopic imaging method for imaging microbeads, each of the microbeads having opaque substances or fluorescent substances marked therein, each of the microbeads further having pattern codes with different depths, shapes, and/or intervals engraved around the microbead, all or a portion of the pattern codes being combined to form an identity number of each of the microbeads, the microbeads being configured to capture specific biochemical substances, the lens-free microscopic imaging method comprising:

disposing the microbeads between an illumination light source and an image sensor;

powering on the illumination light source to emit illumination light from a first orientation to a second orientation towards the microbeads, causing projections of the microbeads to be imaged on the image sensor;

powering on the excitation light source from the first orientation to the second orientation to emit excitation light, reflecting the excitation light by a total reflection device towards the microbeads, causing the specific biochemical substances to generate specific signals;

collecting images of the microbeads and the specific signals, wherein each type of microbeads has a same identity number, each type of microbeads captures a biochemical substance, different types of microbeads capture different biochemical substances, the identity number of the microbead is recognizable by the pattern codes in the images, and an amount of a specific biochemical substance captured by each type of microbeads is quantified by an intensity of the specific signals in the images.

8. The lens-free microscopic imaging method according to claim 7, wherein the illumination light irradiates the microbeads, causing the irradiated microbeads to be projected on the image sensor.

9. The lens-free microscopic imaging method according to claim 7, wherein the illumination light further forms interference fringes on the image sensor, and the interference fringes are collected by the image sensor.

10. A biochemical substance detection system, comprising:

a lens-free microscopic imaging system for imaging microbeads, each of the microbeads having opaque substances or fluorescent substances marked therein, each of the microbeads further having pattern codes with different depths, shapes, and/or intervals engraved around the microbead, all or a portion of the pattern codes being combined to form an identity number of each of the microbeads, the lens-free microscopic imaging system comprising an illumination system and an imaging system; wherein the illumination system comprises an illumination light source, an excitation light source, and a total reflection device, the imaging system comprises an image sensor, the illumination light source and the excitation light source are located at a first orientation, the total reflection device and the image sensor are located at a second orientation, the total reflection device is located between the microbeads and the image sensor; the illumination light source is configured to emit illumination light from the first orientation to the second orientation to irradiate the microbeads, causing projections of the irradiated microbeads to be imaged on the image sensor, the excitation light source is configured to emit excitation light from the first orientation to the second orientation, the total reflection device comprises a total reflection surface facing the image sensor, the total reflection surface is configured to allow the illumination light to pass through, and further configured to reflect the excitation light emitted by the excitation light source to the microbeads to excite the microbeads to generate specific signals, the image sensor is configured to collect images of the microbeads and of the specific signals; and a recognition and detection device configured to receive the images output by the image sensor, recognize the microbeads in the images, an identity number of each of the microbeads, and an amount of the specific biochemical substances captured by each type of microbead, the microbeads with a same identity number are classified into one type of microbead, wherein each type of microbeads has a same identity number, each type of microbeads captures a biochemical substance, different types of microbeads capture different biochemical substances, the identity number of the microbead is recognizable by the pattern codes in the images, and an amount of a specific biochemical substance captured by each type of microbeads is quantified by an intensity of the specific signals in the images.

11. The biochemical substance detection system according to claim 10, wherein the recognition and detection device comprises a recognition and detection system, the recognition and detection system comprises a microbead recognition module and a biochemical substance detection module, the microbead recognition module is configured to recognize the microbeads in the images, the pattern codes of each of the microbeads, and the identity number of each of the microbeads according to a sequence of the pattern codes of each of the microbeads; the biochemical substance detection module is configured to detect in the images an intensity of one of the specific signals sent by each type of microbead, and detect an amount of one of the specific biochemical substances captured by each type of microbead according to the intensity of the specific signal.

12. The biochemical substance detection system according to claim 11, wherein the recognition and detection system further comprises an image reconstruction module, the image reconstruction module is configured to reconstruct the images output by the image sensor, and output reconstructed images to the microbead recognition modules.

13. The biochemical substance detection system according to claim 12, wherein the image reconstruction module uses a digital holographic reconstruction technology to reconstruct the images.

14. The biochemical substance detection system according to claim 10, wherein the recognition and detection system further comprises a machine learning module, the machine learning module is configured to automatically learn recognition results from the recognition module and extract characteristic values for subsequent recognitions by the recognition module.

\* \* \* \* \*